United States Patent [19]

Hartnett et al.

[11] Patent Number: 4,481,300
[45] Date of Patent: Nov. 6, 1984

[54] ALUMINUM OXYNITRIDE HAVING IMPROVED OPTICAL CHARACTERISTICS AND METHOD OF MANUFACTURE

[75] Inventors: Thomas M. Hartnett, Nashua, N.H.; Richard L. Gentilman, Acton; Edward A. Maguire, Ashland, both of Mass.

[73] Assignee: Raytheon Company, Lexington, Mass.

[21] Appl. No.: 570,420

[22] Filed: Jan. 13, 1984

Related U.S. Application Data

[63] Continuation of Ser. No. 297,897, Aug. 31, 1981, abandoned.

[51] Int. Cl.$^3$ ............................................. C04B 35/58
[52] U.S. Cl. ....................................... 501/98; 264/1.2; 264/65; 423/266; 423/275; 423/385; 423/630; 501/152; 501/153; 501/904
[58] Field of Search ............... 423/630, 266, 275, 385; 264/1.2, 65; 501/98, 152, 153, 904

[56] References Cited

U.S. PATENT DOCUMENTS

| | | |
|---|---|---|
| 3,261,667 | 7/1966 | O'Connor ........................ 423/412 |
| 3,711,585 | 1/1973 | Muta et al. ...................... 501/152 X |
| 3,718,490 | 2/1973 | Morgan et al. ....................... 501/98 |
| 4,146,379 | 3/1979 | Copley et al. ...................... 501/904 |
| 4,166,831 | 9/1979 | Rhodes et al. ................... 501/152 X |
| 4,182,972 | 1/1980 | Kaneno et al. .................. 501/152 X |
| 4,184,884 | 1/1980 | Jong ....................................... 501/98 |
| 4,222,978 | 9/1980 | Oda et al. ............................. 264/65 |
| 4,241,000 | 12/1980 | MaCauley et al. ................... 264/65 |

FOREIGN PATENT DOCUMENTS 1188011  4/1970  United Kingdom .

OTHER PUBLICATIONS

McCauley, J. W. et al., "Phase Relations and Reaction Sintering of Transparent Cubic Aluminum Oxynitride Spinel" (ALON), J. Am. Cer. Soc. 62, (9-10), 1979, pp. 476-479.
Lejus, A.-Rev. Int. Hautes Temp. Reract 1(1), 1964, pp. 83-90 and 93-95.

*Primary Examiner*—Helen M. McCarthy
*Attorney, Agent, or Firm*—Denis G. Maloney; Richard M. Sharkansky; Joseph D. Pannone

[57] ABSTRACT

A method of preparing substantially homogeneous aluminum oxynitride powder is provided comprising the steps of reacting gamma aluminum oxide with carbon in the presence of nitrogen, and breaking down the resulting powder into particles in a predetermined size range.

A method of preparing a durable optically transparent body from this powder is also provided comprising the steps of forming a green body of substantially homogeneous cubic aluminum oxynitride powder and sintering said green body in a nitrogen atmosphere and in the presence of predetermined additives which enhance the sintering process. Preferred additives are boron, in elemental or compound form, and at least one additional element selected from the group of yttrium and lanthanum or compounds thereof. The sintered polycrystalline cubic aluminum oxynitride has a density greater than 99% of theoretical density, an in-line transmission of at least 50% in the 0.3–5 micron range, and a resolving angle of 1 mrad or less.

8 Claims, No Drawings

ALUMINUM OXYNITRIDE HAVING IMPROVED OPTICAL CHARACTERISTICS AND METHOD OF MANUFACTURE

This application is a continuation of application Ser. No. 297,897 filed Aug. 31, 1981, now abandoned.

BACKGROUND OF THE INVENTION

This invention relates to durable transparent ceramic compounds. There is a need for these compounds in applications requiring substantial transmission and imaging capabilities in the visible range and the infrared range. These requirements can be found in both military and commercial applications. For example, infrared transparent domes are needed for missiles and transparent envelopes are needed in different types of vapor lamps. Many transparent materials are not adequately durable for these applications, thus, the search has been directed towards developing transparent ceramics. Although many ceramic compounds satisfy the durability requirement, they are not transparent to a sufficient degree for these applications. For instance, alumina is a very hard material but the main problem is that it is not sufficiently transparent and scatters light to an excessive degree. An additional consideration for a candidate material is the cost of manufacturing, thus, methods that require individual processing of these windows are bound to remain an unfeasible alternative from a cost point of view. From this perspective, forging and hot-pressing methods are not desirable. This leaves batch processing methods as a desirable feasible alternative and sintering lends itself to the manufacture of a plurality of units in a single run. However, the sintering of transparent ceramics is not widely known or practiced.

Aluminum oxynitride is a promising candidate for applications requiring multi-spectral transmission capabilities. The only known prior attempt at producing a sintered aluminum oxynitride body is found in U.S. Pat. No. 4,241,000, wherein precursor powders are mixed and the sintering step is used to both react and sinter the precursor powders to produce an oxynitride body. The problem is that the resulting material is not sufficiently transparent for the applications mentioned hereinabove.

SUMMARY OF THE INVENTION

These and other problems are solved by the present invention which provides a method for producing a substantially homogeneous cubic aluminum oxynitride powder which is particularly useful for the sintering of the powder to produce a durable transparent ceramic window. It was found that starting with a substantially homogeneous powder of aluminum oxynitride as prepared by the present invention and using specific additives leads to an adequately transparent window in both the visible and infrared range.

This invention provides for a method of preparing homogeneous aluminum oxynitride comprising the steps of introducing aluminum oxide powder and carbon black in a reaction chamber, providing nitrogen in said chamber, and heating said chamber to react said powder and gas for producing a reacted powder substantially comprising aluminum oxynitride. The reacted powder may also comprise up to 15 weight percent of aluminum oxide and aluminum nitride such that the ratio of aluminum oxide to aluminum nitride is within the composition range of cubic aluminum oxynitride.

This invention further provides for a method of producing transparent sintered aluminum oxynitride bodies comprising the steps of preparing a mixture of aluminum oxide and carbon black, reacting the mixture in the presence of nitrogen and a temperature in the range of 1550°–1850° C., forming a pressed green body of predetermined shape from said mixture, placing said green body in a sintering chamber, providing doping additions in said chamber, said additives comprising one or more elements from the group of yttrium and lanthanum, or compounds thereof, and sintering said green body at a temperature higher than 1900° C. but lower than the solidus temperature of aluminum oxynitride. Preferably, the dopants are in a vapor phase during a portion of said sintering step and vapor transport to and diffuse throughout said body. The doping additives comprise not more than 0.5 weight percent of the weight of the green body. The preferred starting mixture has a carbon content in the range of 5.4–7.1 weight percent. Preferably, the reacted mixture is broken up in particles of size in the range of 0.5 to 5 microns, and the reacted mixture is heated in air or oxygen to remove any organic contaminants that might be present.

Additionally, this invention provides for a cubic aluminum oxynitride body having a density of at least 99% of theoretical density, an in-line transmission of at least 50% in the wavelength range of 0.3–5 microns, and an image resolution of 1 mrad or less.

DESCRIPTION OF THE PREFERRED EMBODIMENT

The present invention produces a substantially homogeneous cubic aluminum oxynitride powder by reacting gamma-aluminum oxide with carbon in a nitrogen atmosphere. More specifically, aluminum oxide (alumina) and carbon black are dry mixed, for instance, in a Patterson-Kelly twin-shell blender for times up to two hours. Preferably, the aluminum oxide has a purity of at least 99.98% and an average particle size of 0.06 microns, and the carbon black has a purity of no less than 97.6% with 2.4% volatile content and an average particle size of 0.027 microns. The carbon content of the mixture can range from 5.4 to 7.1 weight percent. A preferred mixture comprises 5.6 weight percent carbon black and 94.4 weight percent aluminum oxide. The aluminum oxide/carbon mixture is placed in an alumina crucible and is reacted in an atmosphere of flowing nitrogen at temperatures from 1550° C. to 1850° C. for up to two hours at the maximum temperature. The preferred heat treatment is in two steps. In the first step, a temperature of approximately 1550° C. is used for approximately one hour, whereby, for an appropriate ratio of alumina to carbon, the temperature unstable gamma-aluminum oxide is only partially reacted with carbon and nitrogen to form both alpha-aluminum oxide and aluminum nitride. A one hour soak at 1550° C. is sufficient to convert the proper amount of $Al_2O_3$ to AlN. In the second step, a temperature of 1750° C. or up to the solidus temperature of aluminum oxynitride (2140° C.), is used for approximately 40 minutes, whereby alpha-aluminum oxide and aluminum nitride combine to form cubic aluminum oxynitride.

The reacted material resulting from the heat treatment is composed primarily of cubic aluminum oxynitride, but may also contain alumina and/or aluminum nitride in amounts of up to 15 weight percent such that the ratio of aluminum oxide to aluminum nitride is within the composition range of cubic aluminum oxynitride. The amounts of alumina and aluminum nitride can be controlled by the heat treatment and the amount of aluminum nitride produced in the first heating step which in turn depends on the amount of carbon in the starting mixture.

For a first step utilizing the preferred one hour soak at 1550° C., except for Sample 5 which was treated at 1620° C., TABLE I illustrates the effect of using different amounts of carbon in the starting mixture and of different temperatures during the second step of the heat treatment.

TABLE I

| Sample | Weight % Carbon | Temp. (°C.) | Time (mins) | % AlN | % Al$_2$O$_3$ | % ALON |
|---|---|---|---|---|---|---|
| 1 | 5.6 | 1750 | 40 | 3.2 | 10.0 | 86.8 |
| 2 | 7.1 | 1750 | 40 | 4.0 | 0 | 96.0 |
| 3 | 6.5 | 1750 | 40 | 1.88 | 0 | 98.12 |
| 4 | 5.9 | 1750 | 40 | 0.85 | 0 | 99.15 |
| 5 | 5.6 | 1820 | 40 | Trace | Trace | 99.9+ |

The preferred heat treatment produces a resulting composition comprising substantially 100% aluminum oxynitride and corresponds to Sample 5. An alternate preferred resulting composition is that of Sample 1. The resulting aluminum oxynitride powder consists of agglomerated particles which are easily broken apart during ball milling to particles ranging in size from 0.5 to 5 microns.

The reacted material is ball milled in polyurethane or rubber lined mills using methanol as a milling fluid and high alumina grinding balls. Milling time is 16 hours. The milled powder is passed through a 400 mesh and is dried at 65° C. for up to 24 hours. After drying, the powder is heated in air to 600° C. for 2 hours to remove organic contaminants.

Sintering aids are not added in the form of small amounts of preselected doping additives up to 0.5 weight percent of the aluminum oxynitride powder. The additive may also comprise an element selected from the group of yttrium and lanthanum, or compounds thereof. It is believed that other elements of the lanthanide series may similarly be used. Preferably, the oxide of the elements selected are used. A combination of the doping additives may also be used as long as the total amount of additives does not exceed 0.50 weight percent. A preferred combination comprises 0.08 weight percent yttrium oxide (Y$_2$O$_3$) and 0.02 weight percent lanthanum oxide (La$_2$O$_3$). Alternatively, the doping additives may be added during the ball milling of the aluminum oxynitride powder.

The additive-containing aluminum oxynitride powder is placed in rubber molds having predetermined shapes and is isostatically pressed at pressures greater than 15,000 psi to produce green bodies to be used in sintering. The fabricated green bodies are set in containers in the sintering chamber. The containers are composed either entirely of boron nitride or partly of boron nitride and partly of molybdenum metal. Sintering is then performed in a stagnant atmosphere of nitrogen at 0–5 psig. To obtain substantially transparent material, sintering temperatures are higher than 1900° C., but lower than the solidus temperature of aluminum oxynitride which is approximately 2140° C. Sintering is done for a minimum of 24 hours and up to 48 hours.

TABLE II

| Sample | Y$_2$O$_3$ | La$_2$O$_3$ | Temp. °C. | Time h | % in-line transmiss. @ 4 microns | (mm) Thickness | % Density | Optical Resolution |
|---|---|---|---|---|---|---|---|---|
| 1 | none | none | 1930 | 23 | opaque | 1.7 | 98 | — |
| 2 | 0.08 | 0.02 | 1930 | 1 | 5 | 0.82 | 98+ | — |
| 3 | 0.08 | 0.02 | 1930 | 24 | 80 | 1.45 | 99+ | <1 mrad |
| 4 | 0.25 | none | 1930 | 48 | 53 | 1.35 | 99+ | <1 mrad |
| 5 | 0.08 | 0.02 | 1730 | 3 | opaque | 1.5 | — | — |
| 6 | 0.08 | 0.02 | 1910 | 8 | 5 | 0.8 | 98 | — |

Table II shows to some extent the effect of additives, time and temperature on the resultant transparency of the aluminum oxynitride. The density was measured by the Archimedes method, the in-line transmission was measured with a Perkin-Elmer 457 Grating Infared Spectrophotometer, and the resolving angle was measured by using the Standard USAF 1951 Resolution Test Pattern. The temperatures are accurate to within 10° C. A temperature of 1900° C. is the minimum temperature found to consistently produce a transparent material given the proper amount of Y$_2$O$_3$ and/or La$_2$O$_3$. The best amount of additive is the minimum amount needed to produce a liquid phase at the grain boundaries initially yet not be present as a second phase after sintering. Although 0.1 weight percent produced the best results, smaller trace amounts as low as 0.05 weight percent are expected to be adequate. That is, a liquid phase is formed at or near 1900° C. which promotes rapid densification and pore removal. This liquid phase disappears with Y and La going into solid solution with the aluminum oxynitride. This process of liquid phase sintering is thought to be present at the sintering temperature early in the sintering process. After this, solid state diffusion is the means by which the remaining porosity is eliminated and substantial transparency is achieved. Elimination of porosity by solid state diffusion is a much slower means of power elimination so longer times are needed, 24 hours being the minimum preferred duration. This is confirmed by Samples 2 and 6, wherein, even though an adequate amount of additives was used, the samples remain translucent because the duration of the sintering step was limited to 1 and 8 hours, respectively.

It should be understood that the additives discussed hereinabove need not be mixed in with the aluminum oxynitride powder prior to sintering nor do they need to be placed in direct contact with the green body. Again, it is sufficient that the selected additive be available within the sintering chamber for the doping of the aluminum oxynitride. Indeed the unexpected improvement in the transparency of sintered aluminum oxynitride was discovered after sintering a green body, composed strictly of aluminum oxynitride powders, along with an adjacent green body containing yttrium oxide on a boron nitride platform. Thus, this invention is considered to encompass other methods of introducing the additives in the sintering chamber to produce in situ vapor doping of the aluminum oxynitride compact.

An explanation of in situ vapor doping by the presence of specific additives for the enhancement of the sintering is believed to be as follows. At sintering temperatures, the mixture of aluminum oxynitride has a significantly high vapor pressure of $Al_xO_y$ gas species. The $Al_xO_y$ gas reacts with nearby boron nitride present in the container to produce $B_2O_3$ gas and/or $AlBO_2$ gas plus AlN solid. The $B_2O_3$ and/or $AlBO_2$ vapors transport to and react with aluminum oxynitride to produce a liquid phase at grain boundaries which enhances the early stages of sintering. In the case yttrium oxide is used as the additive, the $B_2O_3$ also interacts with yttrium doped aluminum oxynitride or pure $Y_2O_3$ to produce $YBO_2$ gas. The $YBO_2$ vapor transports to the aluminum oxynitride and dopes it with the boron and yttrium. In the case of other elements being used as additives, the $B_2O_3$ similarly reacts to provide a corresponding vapor doping of aluminum oxynitride. It is believed that this additive doping aids the final stages of sintering by causing either solute drag or second phase precipitates to pin grain boundaries and thus preventing excessive grain growth which might otherwise trap pores within the grains.

An alternate explanation is that the yttrium, or components thereof, cause the formation of a liquid phase. This liquid phase promotes rapid densification and significant pore removal in the early stages of sintering so that during the final stages of sintering there is less porosity to be eliminated and high density and transparency are achieved. In this mechanism, boron is necessary only for the transport of yttrium to the aluminum oxynitride.

The method of the present invention avoids many of the problems normally associated with the preparation of aluminum oxynitride by mixing and reacting aluminum oxide and aluminum nitride, such as the varying purity levels, large particle sizes and wide size distribution range of commercially available aluminum nitride, the long reaction times required to form aluminum oxynitride, and the long milling times required to reduce the particle size, which in turn increase the inorganic impurity content of the aluminum oxynitride. Additionally, the present method reduces the cost of manufacturing by avoiding the use of the more expensive aluminum nitride as a starting ingredient, by requiring shorter reaction times to form aluminum oxynitride, and by requiring less milling time to achieve a homogeneous sinterable powder of suitable particle size. The aluminum oxynitride powder prepared by the present method also improves the reproducibility of the sintering process and improves the transparency of the sintered product.

It is understood that the above described embodiments of the invention are illustrative only and modifications thereof may occur to those skilled in the art. Accordingly, it is desired that this invention is not to be limited to the embodiments disclosed herein but is to be limited only as defined by the appended claims.

What is claimed is:

1. A body of polycrystalline cubic aluminum oxynitride material having a density of at least 99% of theoretical density, a sample of said body having an in-line transmission of at least 50% in the wavelength range of 0.3–5 microns said sample having a thickness of 1.45 millimeters.

2. A body of polycrystalline doped cubic aluminum oxynitride material having a density of at least 99% of theoretical density, a sample of said body having an in-line transmissivity of at least 50% in the 0.3–5 micron wavelength range, said sample having a thickness of 1.45 millimeters.

3. The body of aluminum oxynitride material of claim 2 wherein:

said aluminum oxynitride material is formed of substantially single phase aluminum oxynitride, and is doped with boron and at least one element from the group of yttrium and lanthanum.

4. A body of aluminum oxynitride material of claim 2 wherein the sample of said body has a resolving angle of less than 1 mrad.

5. A body of polycrystalline doped cubic aluminum oxynitride material having a density of at least 99% of theoretical density, a sample of said body having an in-line transmissivity of at least 50% to 80% in the 0.3–5 micron wavelength range, said sample having a thickness of 1.45 millimeters.

6. The body of aluminum oxynitride material of claim 5 wherein the material is doped with boron, yttrium and lanthanum.

7. The aluminum oxynitride material of claim 6 wherein the aluminum oxynitride material is formed of substantially single-phase aluminum oxynitride.

8. The body of aluminum oxynitride material of claim 6 wherein the sample of said body has a resolving angle of less than 1 mrad.

* * * * *